(12) United States Patent
Gupta et al.

(10) Patent No.: US 11,514,912 B2
(45) Date of Patent: *Nov. 29, 2022

(54) SYSTEMS AND METHODS FOR ENABLING TOPIC-BASED VERBAL INTERACTION WITH A VIRTUAL ASSISTANT

(71) Applicant: Rovi Guides, Inc., San Jose, CA (US)

(72) Inventors: Vikram Makam Gupta, Karnataka (IN); Sukanya Agarwal, Haryana (IN); Gyanveer Singh, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/182,454

(22) Filed: Feb. 23, 2021

(65) Prior Publication Data

US 2021/0272565 A1    Sep. 2, 2021

Related U.S. Application Data

(63) Continuation of application No. 16/396,106, filed on Apr. 26, 2019, now Pat. No. 10,964,324.

(51) Int. Cl.
| | |
|---|---|
| *G10L 15/22* | (2006.01) |
| *G06F 3/16* | (2006.01) |
| *G10L 25/63* | (2013.01) |
| *G06F 9/451* | (2018.01) |
| *G10L 15/18* | (2013.01) |
| *G10L 15/08* | (2006.01) |

(52) U.S. Cl.
CPC ............ *G10L 15/22* (2013.01); *G06F 3/167* (2013.01); *G06F 9/453* (2018.02); *G10L 15/1815* (2013.01); *G10L 25/63* (2013.01); *G10L 2015/088* (2013.01); *G10L 2015/223* (2013.01)

(58) Field of Classification Search
CPC ..... G10L 15/22; G10L 15/1815; G10L 25/63; G10L 2015/088; G10L 2015/223; G06F 3/167; G06F 9/453
See application file for complete search history.

(56) References Cited

U.S. PATENT DOCUMENTS

| | | | |
|---|---|---|---|
| 8,719,039 B1 | 5/2014 | Sharifi | |
| 9,679,568 B1* | 6/2017 | Taubman | ................ G10L 15/22 |
| 10,681,453 B1 | 6/2020 | Meiyappan et al. | |
| 2006/0293889 A1 | 12/2006 | Kiss et al. | |
| 2010/0121973 A1 | 5/2010 | Lobacheva et al. | |

(Continued)

FOREIGN PATENT DOCUMENTS

GB       201310986       8/2013

*Primary Examiner* — Anne L Thomas-Homescu
(74) *Attorney, Agent, or Firm* — Haley Guiliano LLP

(57) ABSTRACT

Systems and methods are disclosed for enabling verbal interaction with an NLUI application without relying on express wake terms. The NLUI application receives an audio input comprising a plurality of terms. In response to determining that none of the terms is an express wake term pre-programmed into the NLUI application, the NLUI application determines a topic for the plurality of terms. The NLUI application then determines whether the topic is within a plurality of topics for which a response should be generated. If the determined topic of the audio input is within the plurality of topics, the NLUI application generates a response to the audio input.

20 Claims, 16 Drawing Sheets

(56) References Cited

U.S. PATENT DOCUMENTS

| | | |
|---|---|---|
| 2011/0004462 A1 | 1/2011 | Houghton et al. |
| 2012/0197644 A1 | 8/2012 | Nagano et al. |
| 2014/0218461 A1 | 8/2014 | Deland |
| 2015/0332168 A1 | 11/2015 | Bhagwat et al. |
| 2015/0347900 A1 | 12/2015 | Bell et al. |
| 2015/0356836 A1 | 12/2015 | Schlesinger et al. |
| 2017/0025125 A1 | 1/2017 | Alvarez Guevara |
| 2017/0060994 A1 | 3/2017 | Byron et al. |
| 2017/0173262 A1 | 6/2017 | Veltz |
| 2017/0186425 A1 | 6/2017 | Dawes et al. |
| 2017/0351414 A1 | 12/2017 | Macho Cierna et al. |
| 2017/0364520 A1 | 12/2017 | Venkataraman et al. |
| 2018/0018961 A1 | 1/2018 | Lee et al. |
| 2018/0052920 A1 | 2/2018 | Klein et al. |
| 2018/0189267 A1* | 7/2018 | Takiel ................... G10L 15/22 |
| 2018/0211659 A1 | 7/2018 | Segal et al. |
| 2018/0225365 A1* | 8/2018 | Altaf .................. G06F 16/3344 |
| 2018/0341703 A1 | 11/2018 | Mccarty et al. |
| 2018/0365233 A1 | 12/2018 | Cherian |
| 2018/0367480 A1* | 12/2018 | Housman ............. G06F 40/247 |
| 2019/0027141 A1 | 1/2019 | Strong et al. |
| 2019/0066680 A1 | 2/2019 | Woo et al. |
| 2019/0147875 A1 | 5/2019 | Stemmer et al. |
| 2019/0214002 A1 | 7/2019 | Park et al. |
| 2020/0105273 A1 | 4/2020 | O'Donovan |
| 2020/0134151 A1 | 4/2020 | Magi et al. |
| 2020/0175973 A1 | 6/2020 | Bender et al. |
| 2020/0251111 A1 | 8/2020 | Temkin et al. |
| 2020/0312310 A1 | 10/2020 | Houghton et al. |
| 2020/0342858 A1 | 10/2020 | Gupta et al. |

* cited by examiner

500

502

"Daniel Radcliffe was Spotted at a Baseball Game Recently in New York. I Think the Yankees were Playing in that Game, Right?"

504

| Harry Potter |
|---|
| Daniel Radcliffe |
| Hogwarts |
| Quidditch |
| Wizard |
| Child Actor |
| Seeker |
| Play |

506

| MLB |
|---|
| Professional Baseball |
| Baseball |
| Stadium |
| Game |
| New York |
| Yankees |
| Play |

508 — Matching Descriptors: 2/7

510 — Matching Descriptors: 5/7

512 — Relevant Topic: MLB

| USER :Jack | Threshold: 50 |
|---|---|
| List of Topics | Score |
| Harry Potter | 70 |
| MLB | 40 |
| Weather | 60 |
| NBA | 60 |
| Game of Thrones | 30 |

| User :Jack | | Threshold :50 |
|---|---|---|
| List of Topics | Time | Score |
| Harry Potter | Sat, 8pm-9pm | 70 |
| Harry Potter | Sat, 8am-12pm | 40 |
| Harry Potter | Sun, 7pm-10pm | 60 |
| ... | ... | ... |
| Game of Thrones | 12:00am - 11:59pm | 30 |

FIG. 8

SYSTEMS AND METHODS FOR ENABLING TOPIC-BASED VERBAL INTERACTION WITH A VIRTUAL ASSISTANT

CROSS-REFERENCE TO RELATED APPLICATION

This application is a continuation of U.S. patent application Ser. No. 16/396,106, filed Apr. 26, 2019, which is hereby incorporated by reference herein in its entirety.

BACKGROUND

The present disclosure is directed to natural-language user interface (NLUI) applications, and more particularly to NLUI applications that provide conversational answers to user inputs.

SUMMARY

Natural language processing has enabled user interfaces, such as virtual assistants, to sound more human-like when responding to user queries. In a normal conversation between two humans where one person is speaking and the other is listening, the listener considers whether the speaker is directing the conversation towards the listener and responds accordingly. In the case of NLUI applications, there is an insufficient variety of ways for an NLUI application to determine whether a verbal statement is directed to the NLUI application (i.e., where the speaker expects the NLUI application to generate a response). One approach that enables an NLUI application to determine that a response should be generated involves using wake terms (e.g., "OK Google," "Alexa," etc.) that precede the verbal statement and activate the NLUI application. Having to repeat this wake term before every input however leads to an unnatural verbal interaction. For example, in a normal human conversation a speaker seldom repeats the name of the listener before each sentence. The listener does not need to be addressed by name repeatedly and instead relies on other cues (e.g., eye contact, body language, historic context, etc.) to affirm that a verbal statement is directed to the listener. These cues facilitate a more fluid conversation between the two individuals.

Systems and methods are thus described herein for enabling verbal interaction with an NLUI application (e.g., a virtual assistant) without relying on express wake terms. In one embodiment, an NLUI application receives an audio input and parses the audio input to determine a plurality of terms. In response to determining that none of the terms is an express wake term pre-programmed into the NLUI application, the NLUI application determines a topic for the plurality of terms. The NLUI application then determines whether the topic is within a plurality of topics stored in memory. The plurality of topics are pre-determined topics that the NLUI application will generate responses for, even if an audio input does not include a wake term. For example, "baseball" may be a topic in the plurality of topics. If an audio input is related to "baseball," the NLUI application will generate a response to the audio input. If the determined topic of the audio input is not within the plurality of topics, the NLUI application will generate no response to the audio input.

Various methods can be employed to determine the topic of the audio input. In some embodiments, each respective topic in the plurality of topics is associated with a plurality of descriptive terms. For each topic, the NLUI application compares the plurality of terms of the audio input with the plurality of descriptive terms of the respective topic. Based on the comparing, the NLUI may determine that at least a threshold amount of terms match between the plurality of terms of the audio input and the plurality of descriptive terms of a particular topic. In response to this determination, the NLUI application determines that the plurality of terms of the audio input corresponds to the particular topic.

In some embodiments, the NLUI application determines whether the audio input includes essential descriptive terms of a particular topic. The essential descriptive terms may be exclusive to a particular topic. For example, the descriptive term "points" may be shared between the topics "baseball" and "basketball," whereas the essential descriptive term "home run" may be exclusive to "baseball." The NLUI application identifies the number of matching essential descriptive terms between the plurality of terms of the audio input and the plurality of essential descriptive terms. In order to classify the audio input as pertaining to a particular topic, the NLUI application determines that the number of matches of essential descriptive terms exceeds a threshold number of matches.

The plurality of topics may even be split into two sets: a first subset of topics for which responses should be generated and a second subset of topics for which responses should not be generated. Because there may be shared descriptive terms between all of the topics in the plurality of topics, when determining the topic for the plurality of terms, the NLUI application may use a normalization technique to identify the most relevant topic to an audio input. The NLUI application may, for example, determine that a number of the plurality of terms corresponds to both a first topic of the first subset and a second topic of the second subset. Accordingly, the NLUI application identifies a first number of descriptive terms in the first topic and a second number of descriptive terms in the second topic. To determine a first amount of matches in the first topic, the NLUI application normalizes the number by the first number, and to determine a second amount of matches in the second topic, the NLUI application normalizes the number by the second number. The NLUI application then determines whether the first amount is greater than the second amount. In response to determining that the first amount is greater than the second amount, the NLUI application determines that the plurality of terms of the audio input corresponds to the first topic.

In order for the NLUI application to generate a response to an audio input, the NLUI application may evaluate the importance of a topic in some embodiments. For each topic, the NLUI application tracks and stores, in a database of topic scores, a respective score that indicates the importance of the topic. The database of topic scores may also include a respective time-based score associated with a period of time for each topic. Subsequent to determining the topic of the plurality of terms, the NLUI application retrieves the score of the topic from the database and determines whether the score is greater than a threshold score. If a time-based score that corresponds with the time of receipt of the audio input is identified in the database, the NLUI application particularly determines whether the time-based score is greater than the threshold score. In response to determining that the score is greater than the threshold score, the NLUI application generates the response to the audio input. If the score is less than the threshold score, the NLUI application generates no response to the audio input.

Subsequent to generating no response to the audio input, the NLUI application may receive an additional audio input indicating that the response is required. For example, the user may have provided the audio input with the expectation that the NLUI application would respond. Because the additional audio input indicates that the response to the audio input should have been generated, the NLUI application increases a score of the topic in the database of topic scores and generates the response to the audio input.

In contrast, the additional audio input may indicate that a response should not have been generated. For example, the user may have provided an audio input without the intention of engaging the NLUI application for a response and the NLUI application may have responded anyway. Because the additional audio input indicates that the response should have not been generated, the NLUI application decreases a score of the topic in the database of topic scores to prevent, at a future time, the generation of a response to a different audio input related to the topic.

The NLUI application may adjust (i.e., increase or decrease) the score of the topic specifically based on the tone of the additional audio input. The tone of the additional audio input (e.g., angry, lighthearted, amused, etc.) is categorized by the NLUI application into a level of dissatisfaction (e.g., dislikes the topic, likes the topic, etc.). The NLUI application adjusts the score by a magnitude proportional to the level of dissatisfaction.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an illustrative example of determining a topic for an audio input based on matching descriptive terms when more than one relevant topic is identified, in accordance with some embodiments of the disclosure;

FIG. 7 shows an illustrative example of a database that stores scores for various topics, in accordance with some embodiments of the disclosure;

FIG. 8 shows an illustrative example of a database that stores time-based scores for various topics, in accordance with some embodiments of the disclosure;

DETAILED DESCRIPTION

Figure 1:
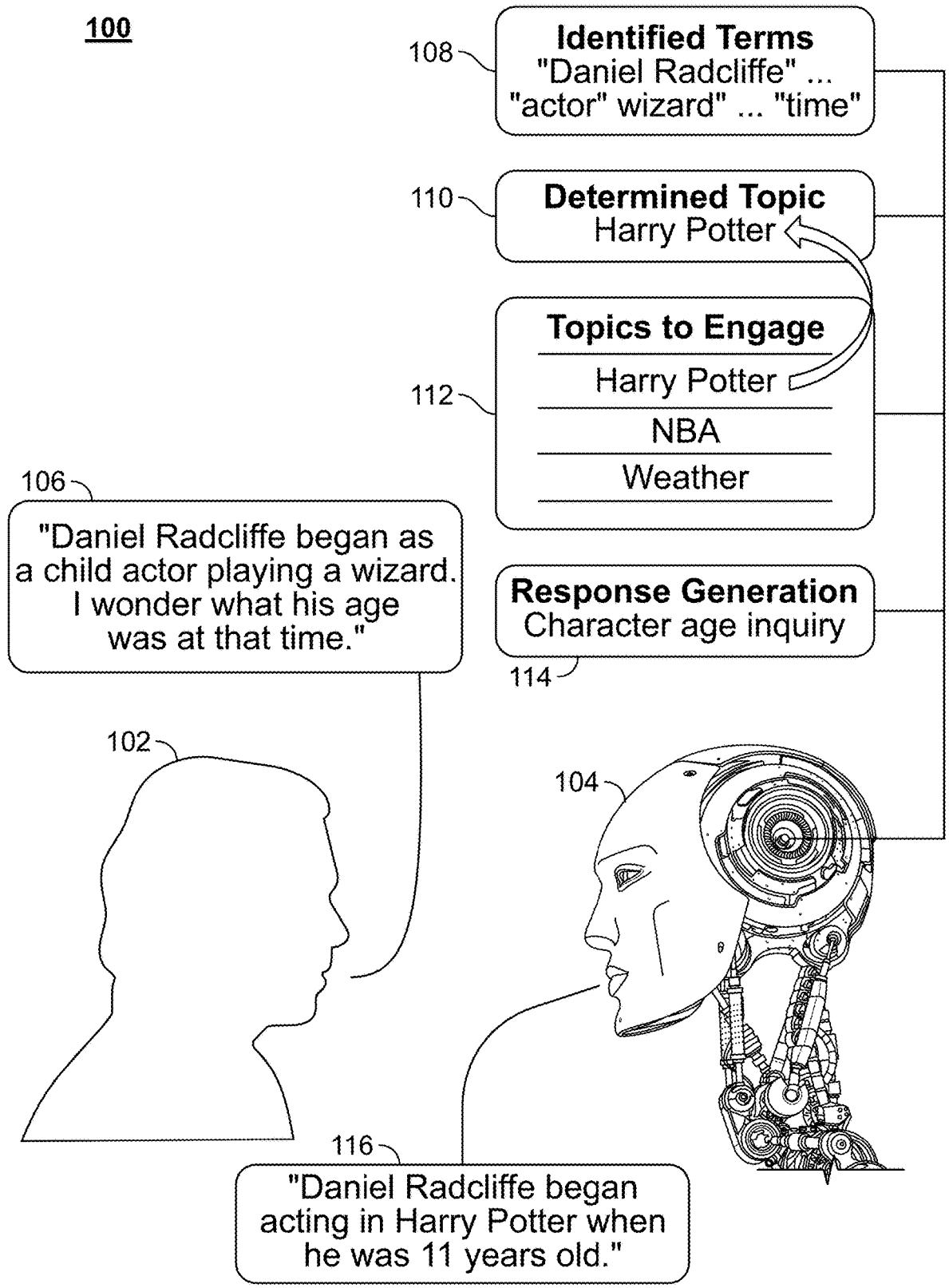
FIG. 1 shows an illustrative example of verbal interaction with a virtual assistant that provides responses to inputs corresponding to a plurality of topics, in accordance with some embodiments of the disclosure.

FIG. 1 shows illustrative example 100 of verbal interaction with a virtual assistant that provides responses to inputs corresponding to a plurality of topics, in accordance with some embodiments of the disclosure. In illustrative example 100, user 102 provides audio input 106 "Daniel Radcliffe began as a child actor playing a wizard. I wonder what his age was at that time." Audio input 106 is received by robot 104, which includes control circuitry executing an NLUI application. The NLUI application of robot 104 parses audio input 106 to identify a plurality of terms (identified terms 108). For example, the NLUI application executes a speech recognition algorithm to convert the sound signals of audio input 106 into text. Identified terms 108 includes terms that appear in audio input 106, namely "Daniel Radcliffe," "began," "as," "a," . . . "that," "time."

The NLUI application determines whether the identified terms include an express wake word. An express wake word is a predetermined word or phrase that activates the response generation processes of a virtual assistant. The wake word for the NLUI application of robot 104 may be "Hey Robot" and may be stored in memory of robot 104 or a remote server. Wake words conventionally precede a user query. For example, when addressing a smart speaker (e.g., an Amazon Echo™), a user initiates the smart speaker with a wake word (e.g., "Alexa") and proceeds to provide a query. Although wake words allow a smart speaker to detect when a query directed to the smart speaker is to be resolved, they do not promote conversational interactions. Virtual assistants endeavor to sound human-like, yet initiating a conversation with a virtual assistant involves constantly using a wake word before each audio input—which far from parallels normal human discussions.

In illustrative example 100, the NLUI application of robot 104 determines that identified terms 108 do not include an express wake word or phrase. In response to determining that identified terms 108 do not include an express wake word, the NLUI application determines a topic for identified terms 108. The intent here is to provide a response to audio input 106 regardless of whether an express wake word is included in audio input 106. In conversations between two humans, various verbal, gestural, and contextual cues are employed to gain attention. In illustrative example 100, the NLUI application of robot 104 is pre-programmed with a plurality of topics for which the NLUI application will generate responses when detecting an audio input of a matching topic. While wake words are associated with verbal cues, this topic-based response generation is associated with contextual cues (e.g., respond based on what a user is talking about). For example, topics 112 include "Harry Potter," "NBA," and "weather." Accordingly, the NLUI application will generate a response to audio input 106 in response to determining that audio input 106 corresponds to a topic in topics 112.

When determining the topic of audio input 106, the NLUI application retrieves a plurality of descriptive terms for each topic in topics 112 and compares identified terms 108 with the respective plurality of descriptive terms. This process is discussed in further detail in example 400 of FIG. 4. In example 100, the NLUI application classifies the identified terms 108 to correspond to the topic "Harry Potter." In response to determining that the topic "Harry Potter" is in topics 112, the NLUI application proceeds to response generation 114. As an example, the NLUI application may identify a query in audio input 106 (e.g., character age inquiry) using natural language processing at response generation 114, perform a search for an answer to the query, and output response 116 "Daniel Radcliffe began acting in Harry Potter when he was 11 years old."

Figure 2:
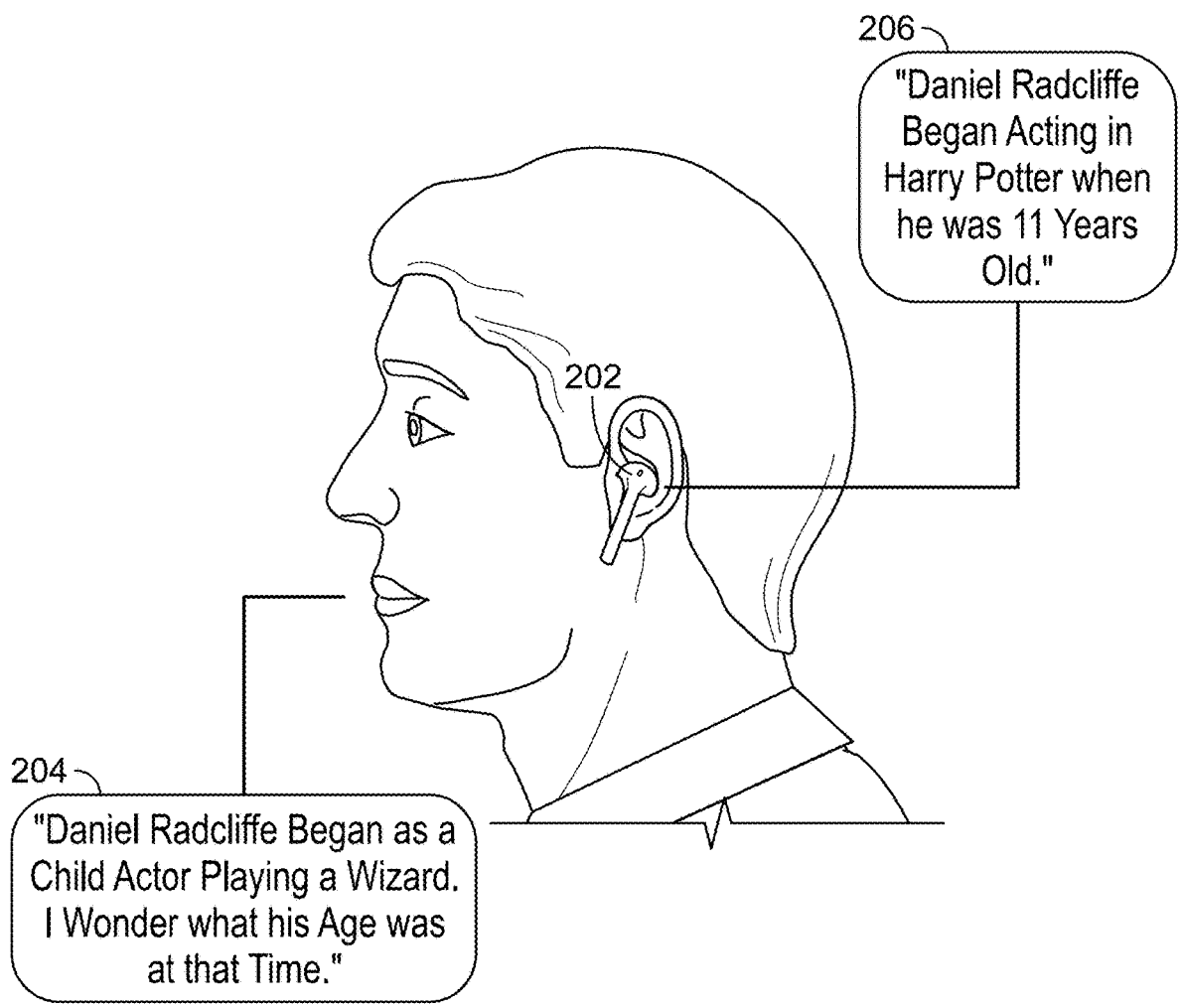
FIG. 2 shows an illustrative example of verbal interaction with an audio-based virtual assistant, in accordance with some embodiments of the disclosure.

FIG. 2 shows illustrative example 200 of verbal interaction with an audio-based virtual assistant, in accordance with some embodiments of the disclosure. Speaker 202 is depicted as a wireless earphone featuring a microphone and a small speaker. Speaker 202 receives audio input 204 "Daniel Radcliffe began as a child actor playing a wizard. I wonder what his age was at that time" via the microphone. Using the process described in FIG. 1 (e.g., from determining identified terms 108 to response generation 114), the NLUI application of speaker 202 outputs response 206 "Daniel Radcliffe began acting in Harry Potter when he was 11 years old" through the smaller speaker within the ear of the user. It should be noted that the process described in FIG. 1 may be executed by the control circuitry of speaker 202, the control circuitry of a paired device (e.g., a smartphone connected to speaker 202), the control circuitry of a remote server, or any combination thereof. Furthermore, speaker 202 may be any device capable of both receiving an audio input and audibly outputting a response (e.g., a smart speaker such as an Amazon Echo).

Figure 3:
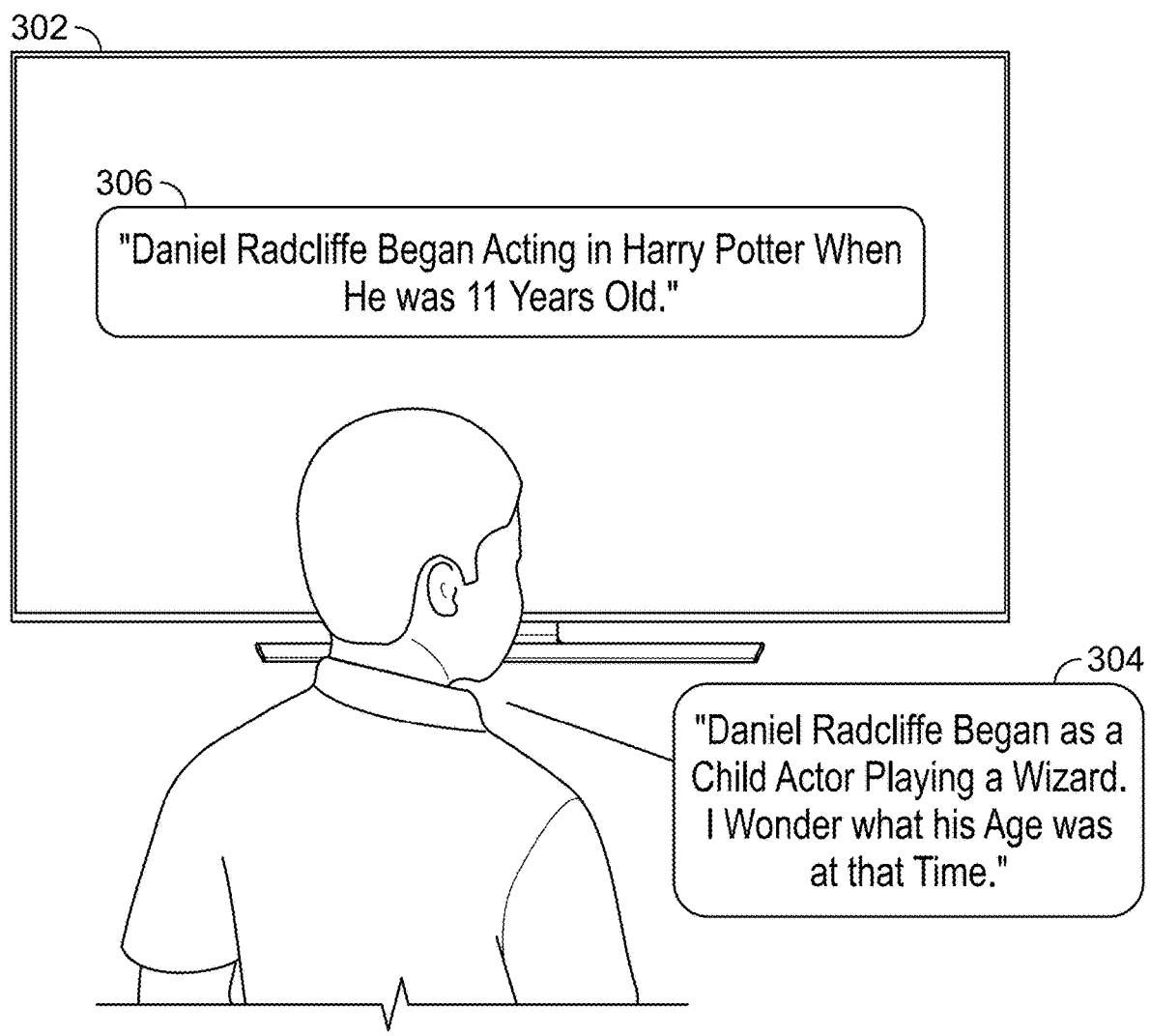
FIG. 3 shows an illustrative example of verbal interaction with a display-based virtual assistant, in accordance with some embodiments of the disclosure.

FIG. 3 shows illustrative example 300 of verbal interaction with a display-based virtual assistant, in accordance with some embodiments of the disclosure. Display 302 is depicted as a smart television featuring a microphone and a screen. Display 302 receives audio input 304 via the microphone. Using the process described in FIG. 1 (e.g., from determining identified terms 108 to response generation 114), the NLUI application of display 302 generates response 306 on the screen. It should be noted that the process described in FIG. 1 may be executed by the control circuitry of display 302, the control circuitry of a paired device (e.g., a set-top box connected to display 302), the control circuitry of a remote server, or any combination thereof. Furthermore, display 302 may be any device capable of both receiving an audio input and visually outputting a response (e.g., a tablet, a smartphone, etc.).

Figure 4:
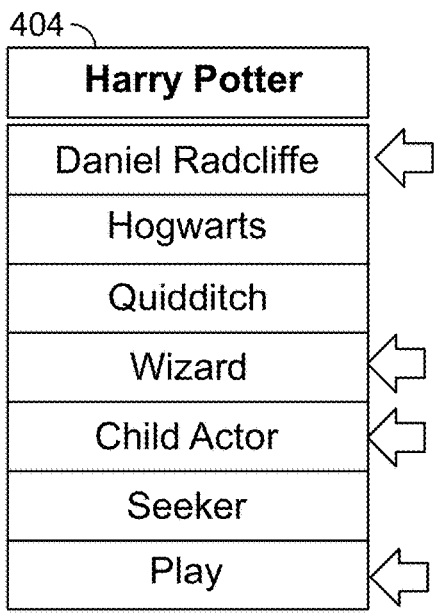
FIG. 4 shows an illustrative example of determining a topic for an audio input based on matching descriptive terms, in accordance with some embodiments of the disclosure.

FIG. 4 shows illustrative example 400 of determining a topic for an audio input based on matching descriptive terms, in accordance with some embodiments of the disclosure. Audio input 402 is the same as audio input 106. Referring back to example 100, the NLUI application of robot 104 parses audio input 106 to extract identified terms 108. When determining the topic for identified terms 108, the NLUI application may retrieve from memory a data structure that lists a plurality of topics and a plurality of descriptive terms for each topic. For example, the data structure may be a two-dimensional matrix in which each topic is assigned a column and each row represents a descriptive term. Array 404 depicts a single column from the two-dimensional matrix. The string of the topic "Harry Potter" is stored as the first entry of array 404, and all subsequent entries are strings of descriptive terms associated with "Harry Potter." The descriptive terms include "Daniel Radcliffe," "Hogwarts," "Quidditch," etc. In example 400, descriptive terms that match with terms from audio input 402 are marked with arrow indicators. When identifying these terms, the NLUI application runs a search for each term in identified terms 108 in array 404. In some embodiments, the NLUI application filters identified terms 108 to identify key terms (depicted in bold in FIG. 4) such as nouns, verbs, adverbs, and adjectives. The search for matching descriptive terms is then only performed for the key terms. For example, the NLUI application identifies the noun "Daniel Radcliffe" and runs a string comparison with each descriptive term in the two-dimensional matrix until it arrives at the descriptive term "Daniel Radcliffe" in array 404. In response to comparing all of identified terms 108 with descriptive terms found in the two-dimensional matrix, the NLUI application determines that four of seven descriptive terms associated with the topic "Harry Potter" match with identified terms 108 (matching descriptors 406). The NLUI application may then compare the number of matches to a pre-determined threshold. For example, the pre-determined threshold may be 50%, indicating that in order for a plurality of terms to be classified with a topic, at least half of the descriptive terms of the topic need to match with the plurality of terms. In example 400, because 57% of the descriptive terms have been matched, the NLUI application determines that the pre-determined threshold has been exceeded and accordingly identified terms 108 are classified by relevant topic 408 "Harry Potter."

FIG. 5 shows illustrative example 500 of determining a topic for an audio input based on matching descriptive terms when more than one relevant topic is identified, in accordance with some embodiments of the disclosure. In some embodiments, the two-dimensional matrix may be indexed to improve look-up efficiency (e.g., by reducing look-up times and processing). For example, for each descriptive term, the NLUI application may list associated topics. The NLUI application can thus identify the topics associated with each term in an audio input, tally the number of times a topic is matched with the audio input, and select the topic that is most relevant to the audio input (i.e., the topic with the most matches). In example 500, audio input 502 includes the statement "Daniel Radcliffe was spotted at a baseball game recently in New York. I think the Yankees were playing in that game, right?" The NLUI application parses (e.g., via speech-to-text) audio input 502 to identify the terms stated and compares each term with the descriptive terms in the two-dimensional matrix of topics. The NLUI application determines that a first input term "Daniel Radcliffe" matches a descriptive term in the topic "Harry Potter" and that a second input term "Baseball" matches a descriptive term in the topic "MLB." Once the NLUI application has compared all of the terms of audio input 502 with descriptive terms, the NLUI application may determine that of the seven descriptive terms of the topic "Harry Potter," there are two matches (matches 508) and that of the seven descriptive terms of the topic "MLB," there are five matches (matches 510). The NLUI application compares the amount of matches in matches 508 with matches 510 to determine that "MLB" has the higher number of matches. As a result, the NLUI application determines that audio input 502 corresponds to relevant topic 512, namely "MLB."

It should be noted that unlike a wake-word detection approach in which an NLUI application monitors inputs for a particular word to trigger a response, the disclosed methods are searching for a particular topic (e.g., requiring contextual cues). In example 100, the topics that the NLUI application provides responses for are "Harry Potter," "NBA," and "Weather." The term "Daniel Radcliffe" appears in both audio input 402 and audio input 502. In a wake-word detection approach, if "Daniel Radcliffe" was considered a wake word, the NLUI application would generate a response. In the disclosed method, however, because audio input 502 refers to "Daniel Radcliffe" in the context of baseball, the NLUI application classifies audio input 502 under relevant topic 512 "MLB." This topic is not in the plurality of topics that the NLUI application is supposed to engage in. Accordingly, the NLUI application does not generate a response for audio input 502.

Figure 6:
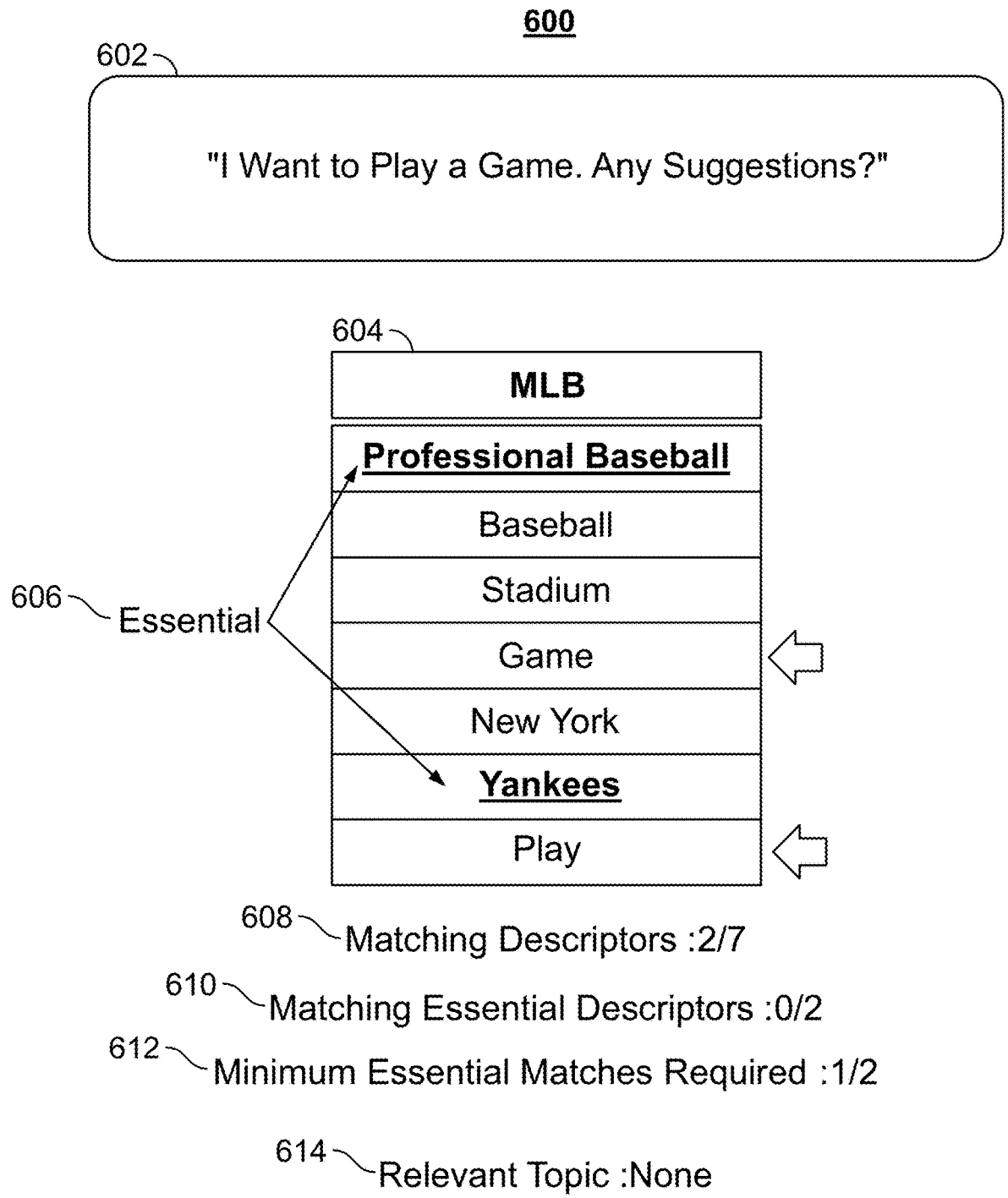
FIG. 6 shows an illustrative example of determining a topic for an audio input based on matching essential descriptive terms, in accordance with some embodiments of the disclosure.

FIG. 6 shows illustrative example 600 of determining a topic for an audio input based on matching essential descriptive terms, in accordance with some embodiments of the disclosure. In example 600, the NLUI application receives audio input 602 "I want to play a game. Any suggestions?" Audio input 602 is a vague statement that can pertain to several topics. For example, audio input 602 can potentially refer to baseball, tennis, video games, etc. In order to determine whether an audio input may be classified under a particular topic, the NLUI application considers whether there are essential descriptive terms in the audio input. Essential descriptive terms differ from normal descriptive terms in that they are exclusive to a particular topic. For example, in array 604, which contains descriptive terms for the topic "MLB," essential terms 606 are "professional baseball" and "Yankees." The NLUI application may require a minimum number of matches for an audio input to be classified under a topic. In example 600, threshold 612 is 50% of essential descriptive terms 606. Essential descriptive terms may be marked in array 604, and in some embodiments, may be located in a separate data structure indicative of essential descriptive terms for each category. When the NLUI application compares the terms in audio input 602 with the descriptive terms in the two-dimensional matrix, the NLUI application determines two of seven descriptive terms match with terms in audio input 602 (matches 608) and no essential descriptive terms match (matches 610). The NLUI application then compares matches 608 with a first threshold indicative of the minimum amount of total matches required per topic (e.g., 2/7) and threshold 612 indicative of the minimum amount of matching essential descriptive terms required per topic (e.g., ½). In response to determining that matches 608 is greater than or equal to the first threshold and that matches 610 is greater than or equal to threshold 612, the NLUI application determines that audio input 602 can be classified under the topic "MLB." Because in example 600 only one of the thresholds is met, the NLUI application determines that audio input 602 cannot be classified under topic "MLB." In reference to example 100, the NLUI application may additionally determine that audio input 602 cannot be classified under topics "Harry Potter" and "Weather" either, and therefore relevant topic 614 is "none" (i.e., no topic is determined to correspond to the audio input).

FIG. 7 shows illustrative example 700 of a database that stores scores for various topics, in accordance with some embodiments of the disclosure. The NLUI application may monitor conversations pertaining to an abundance of topics. These topics may be preprogrammed into the NLUI application and can be modified or updated over time. Although the NLUI application is potentially capable of responding to any audio input so long as it can be classified under a topic, a user may not prefer that the NLUI application generate a response for every topic. To personalize the experience of using the NLUI application, a database of topic scores depicted in example 700 is employed. The database may be stored on a local device or a remote server. The database can specifically be associated with a particular user profile. For example, the database in example 700 is associated with a user "Jack." The NLUI application may store voice data from inputs received by Jack in order to detect whether future audio inputs originate from Jack (e.g., share the same vocal information captured in the voice data). The database lists a threshold value that represents a minimum score that a topic must have for the NLUI application to generate a response. The database in example 700 lists topics including "Harry Potter," "MLB," "Weather," and "NBA." It should be noted that following example 100, only "Harry Potter," "NBA," and "Weather" feature a score greater than the threshold. Subsequent to identifying a topic for an audio input, the NLUI application determines whether the score of the topic meets or exceeds a threshold score. In response to determining that the threshold score is met or exceeded, the NLUI application generates a response. Otherwise, no response is generated by the NLUI application. For example, after determining that the topic of audio input 502 is "MLB," the NLUI application compares the score of "MLB" (40) with the threshold score (50). In response to determining that the score of MLB is less than the threshold score, the NLUI application does not generate a response to audio input 502.

FIG. 8 shows an illustrative example 800 of a database that stores time-based scores for various topics, in accordance with some embodiments of the disclosure. The database of topic scores can additionally feature time-based scores. Time-based scores are scores for a topic for a particular window of time. For example, the user may prefer receiving responses to audio inputs at a particular time of the day, but not at a different time. In this case, an additional column is added to the database of topic scores listing time windows of a day. In example 800, the topic "Harry Potter" has three unique scores. The first is a time window on a Saturday between 8:00 pm and 9:00 pm with an associated score of 70. The second is a time window on a Saturday between 8:00 am and 12:00 pm with an associated score of 40. Subsequent to identifying the topic for an audio input, the NLUI application may determine a day and a time on which the audio input was received. The NLUI application may then determine the time window that the day and the time fall under in the database of topic scores. In response to determining the time window, the NLUI application retrieves the time-based score associated with the time window. The time-based score is compared with the threshold score by the NLUI application to determine whether to generate a response to the audio input. Referring to example 100, the NLUI application determines that audio input 106 corresponds to topic 110 "Harry Potter." The NLUI application may then determine that audio input 106 was received on a Saturday at 8:04 pm. The NLUI application subsequently retrieves the time-based score of 70 from the database of topic scores in response to determining that the time of receipt of audio input 106 falls under the first time window. Furthermore, based on determining that the time-based score is greater than the threshold score, the NLUI application proceeds to response generation 114.

Figure 9:
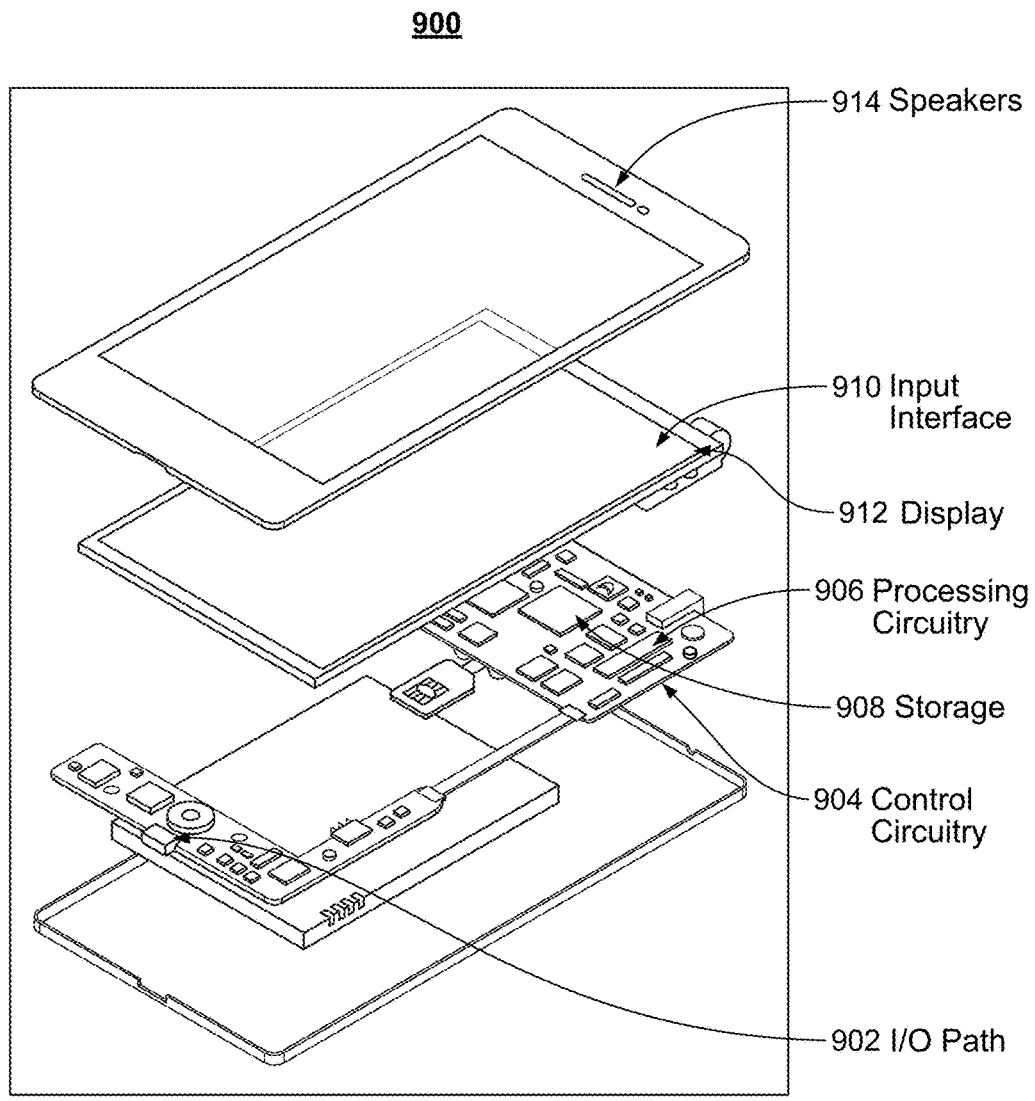
FIG. 9 is a diagram of an illustrative device, in accordance with some embodiments of the disclosure.

FIG. 9 shows a generalized embodiment of illustrative device 900. As depicted in FIG. 9, device 900 is a smartphone. However, device 900 is not limited to smartphones and may be any computing device. For example, device 900 of FIG. 9 can be implemented in system 1000 of FIG. 10 as device 1002 (e.g., a smartphone, a robot, a smart television, a smart speaker, a computer, or any combination thereof) or server 1006.

Device 900 may receive data via input/output (hereinafter I/O) path 902. I/O path 902 may provide received data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communication paths (described below). I/O functions may be provided by one or more of these communication paths, but are shown as a single path in FIG. 9 to avoid overcomplicating the drawing.

Control circuitry 904 may be based on any suitable processing circuitry such as processing circuitry 906. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for an NLUI application stored in memory (i.e., storage 908).

An NLUI application may be a stand-alone application implemented on a device or a server. The NLUI application may be implemented as software or a set of executable instructions. The instructions for performing any of the embodiments discussed herein of the NLUI application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 9 the instructions may be stored in storage 908, and executed by control circuitry 904 of a device 900.

In some embodiments, an NLUI application may be a client-server application where only the client application resides on device 900 (e.g., device 1002), and a server application resides on an external server (e.g., server 1006). For example, an NLUI application may be implemented partially as a client application on control circuitry 904 of device 900 and partially on server 1006 as a server application running on control circuitry. Server 1006 may be a part of a local area network with device 1002, or may be part of a cloud computing environment accessed via the Internet. In a cloud computing environment, various types of computing services for performing searches on the Internet or informational databases, providing storage (e.g., for the database of topic scores) or parsing data are provided by a collection of network-accessible computing and storage resources (e.g., server 1006), referred to as "the cloud." Device 900 may be a cloud client that relies on the cloud computing capabilities from server 1006 to generate the responses of the NLUI application. When executed by control circuitry of server 1006, the NLUI application may instruct the control circuitry to generate the NLUI application output (e.g., the topic-based response) and transmit the generated output to device 1002. The client application may instruct control circuitry of the receiving device 1002 to generate the NLUI application output. Alternatively, device 1002 may perform all computations locally via control circuitry 904 without relying on server 1006.

Control circuitry 904 may include communications circuitry suitable for communicating with an NLUI application server or other networks or servers. The instructions for carrying out the above-mentioned functionality may be stored and executed on server 1006. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 1006) may be used to supplement storage 908 or instead of storage 908.

A user may send instructions to control circuitry 904 using user input interface 910 of device 900. User input interface 910 may be any suitable user interface touchscreen, touchpad, or stylus and may be responsive to external device add-ons such as a remote control, mouse, trackball, keypad, keyboard, joystick, voice recognition interface, or other user input interfaces. Display 910 may be a touchscreen or touch-sensitive display. In such circumstances, user input interface 910 may be integrated with or combined with display 912. Display 912 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Speakers 914 may be provided as integrated with other elements of user equipment device 900 or may be stand-alone units. An audio component of the response generated by the NLUI application and other content displayed on display 912 may be played through speakers 914. In some embodiments, the audio may be distributed to a receiver (not shown), which processes and outputs the audio via speakers 914.

Control circuitry 904 may allow a user to provide user profile information or may automatically compile user profile information. For example, control circuitry 904 may monitor the topics preferred by the user. In some embodiments, control circuitry 904 monitors user inputs that are not queries, such as texts, calls, conversation audio, social media posts, etc., to detect preferred topics. Control circuitry 904 may store the preferred topics in a database of topic scores linked to the user profile. Additionally, control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

Figure 10:
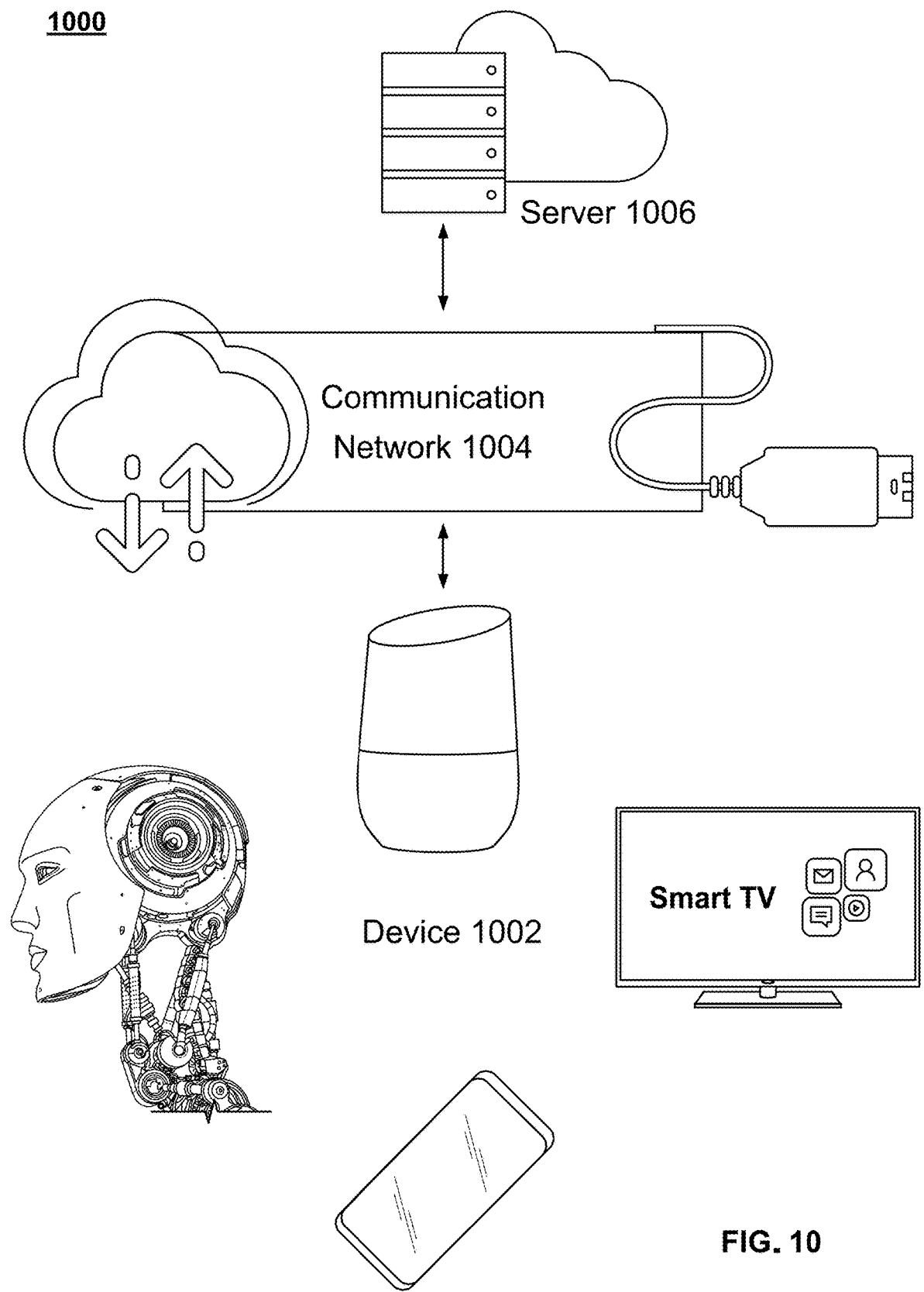
FIG. 10 is a diagram of an illustrative media system, in accordance with some embodiments of the disclosure.

As depicted in FIG. 10, device 1002 may be coupled to communication network 1004. Communication network 1004 may be one or more networks including the Internet, a mobile phone network, mobile voice or data network (e.g., a 4G or LTE network), cable network, public switched telephone network, Bluetooth, or other types of communications network or combinations of communication network. Thus, device 1002 may communicate with server 1006 over communication network 1004 via communications circuitry described above. In should be noted that there may be more than one server 1006, but only one is shown in FIG. 10 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths.

Figure 11:
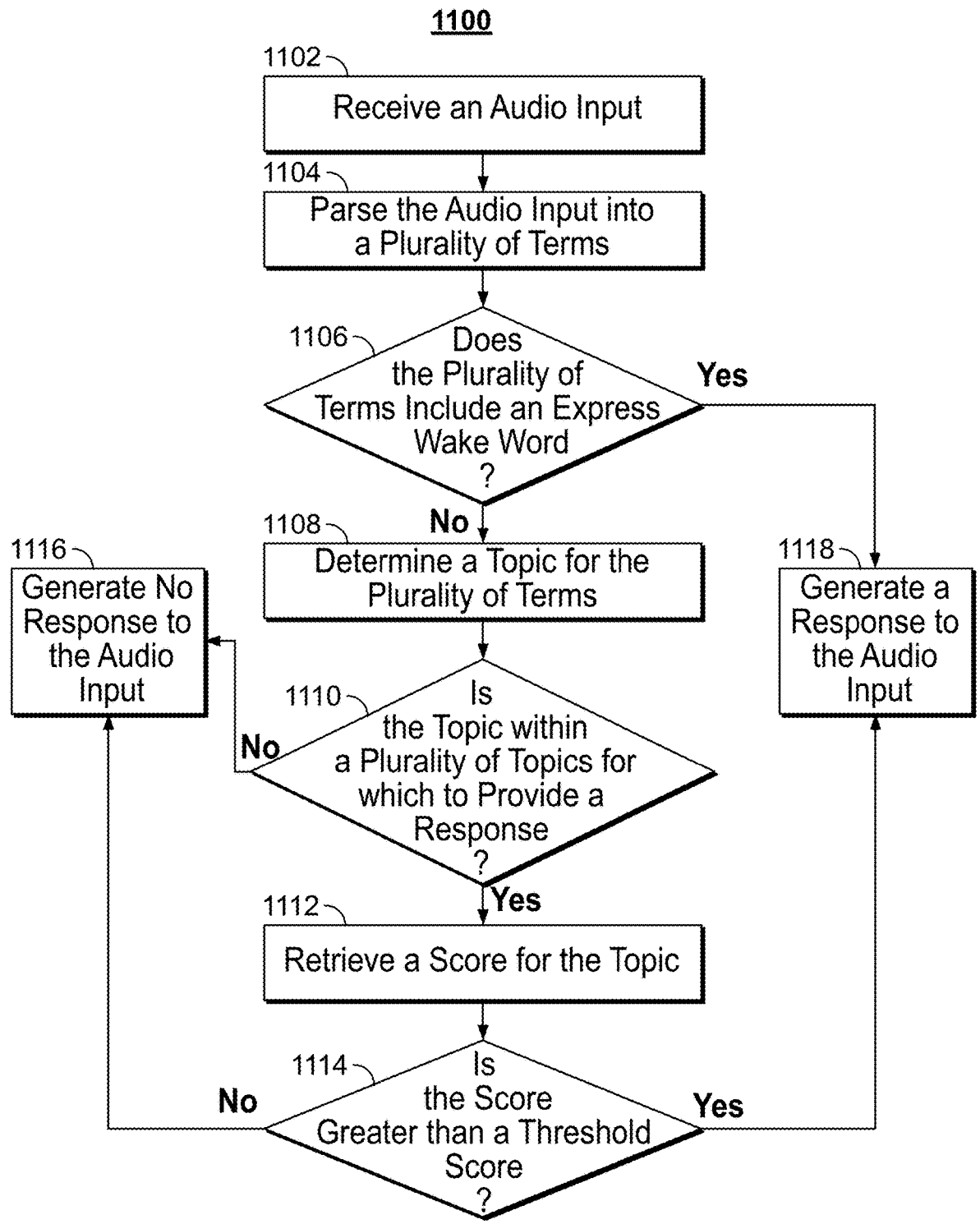
FIG. 11 is a flowchart of an illustrative process for enabling verbal interaction with a virtual assistant without relying on express wake terms, in accordance with some embodiments of the disclosure.

FIG. 11 is a flowchart of illustrative process 1100 for enabling verbal interaction with a virtual assistant without relying on express wake terms, in accordance with some embodiments of the disclosure. At 1102, control circuitry 904 receives an audio input (e.g., audio input 106) via I/O Path 902. At 1104, control circuitry 904 (e.g., of server 1006, device 1002, or any combination thereof) parses the audio input into a plurality of terms (e.g., identified terms 108). For example, control circuitry 904 may utilize a speech-to-text algorithm.

At 1106, control circuitry 904 determines whether the plurality of terms includes an express wake word. For example, identified terms 108 includes "Daniel Radcliffe," "actor," "wizard," etc., and an express wake word may be "Hey Robot," stored in storage 908. Control circuitry 904 may perform a search for the express wake word in identified terms 108. In response to determining that the plurality of terms (e.g., identified terms 108) do not include the express wake word, at 1108, control circuitry 904 determines a topic for the plurality of terms.

The process of determining a topic for the plurality of terms is described in example 400. As described in example 400, the determined topic for audio input 106 is "Harry Potter." At 1110, control circuitry 904 determines whether the topic is within a plurality of topics for which to provide a response. For example, control circuitry 904 may retrieve a plurality of topics (e.g., topics 112) from storage 908 of device 1002 or server 1006. In response to determining that the topic is within the plurality of topics, at 1112, control circuitry 904 retrieves a score for the topic. For example, control circuitry 904 may determine that the topic "Harry Potter" is included in topics 112. Accordingly, control circuitry 904 will retrieve a score for the topic from a database of topic scores stored in storage 908. The database as presented in example 700 lists the score for "Harry Potter" as 70.

Alternatively, control circuitry 904 may determine a time of receipt of audio input 106 (e.g., Saturday at 8:14 pm) and retrieve a time-based score from the database of topic scores. As depicted in example 800, this time-based score is 70 because it is associated with the topic "Harry Potter" and the time window "Sat, 8pm-9 pm."

At 1114, control circuitry 904 determines whether the score is greater than a threshold score. The threshold score (e.g., 50) is listed in the database of topic scores in example 700. In response to determining that the score is greater than the threshold score, process 1100 ends at 1118, where control circuitry 904 generates a response to the audio input (e.g., via response generation 114) and outputs the response (e.g., via speakers 914, display 912, or any combination thereof). If, at 1110, control circuitry 904 determines that the topic is not within the plurality of topics or if, at 1114, control circuitry 904 determines that the score is less than the threshold score, process 1100 ends at 1116, where control circuitry 904 does not generate a response to the audio input. If, at 1106, control circuitry 904 detects an express wake term in the plurality of terms, process 1100 goes directly to 1118, where control circuitry 904 generates a response to the audio input. Subsequent to generating a response, control circuitry 904 outputs the response.

Figure 12:
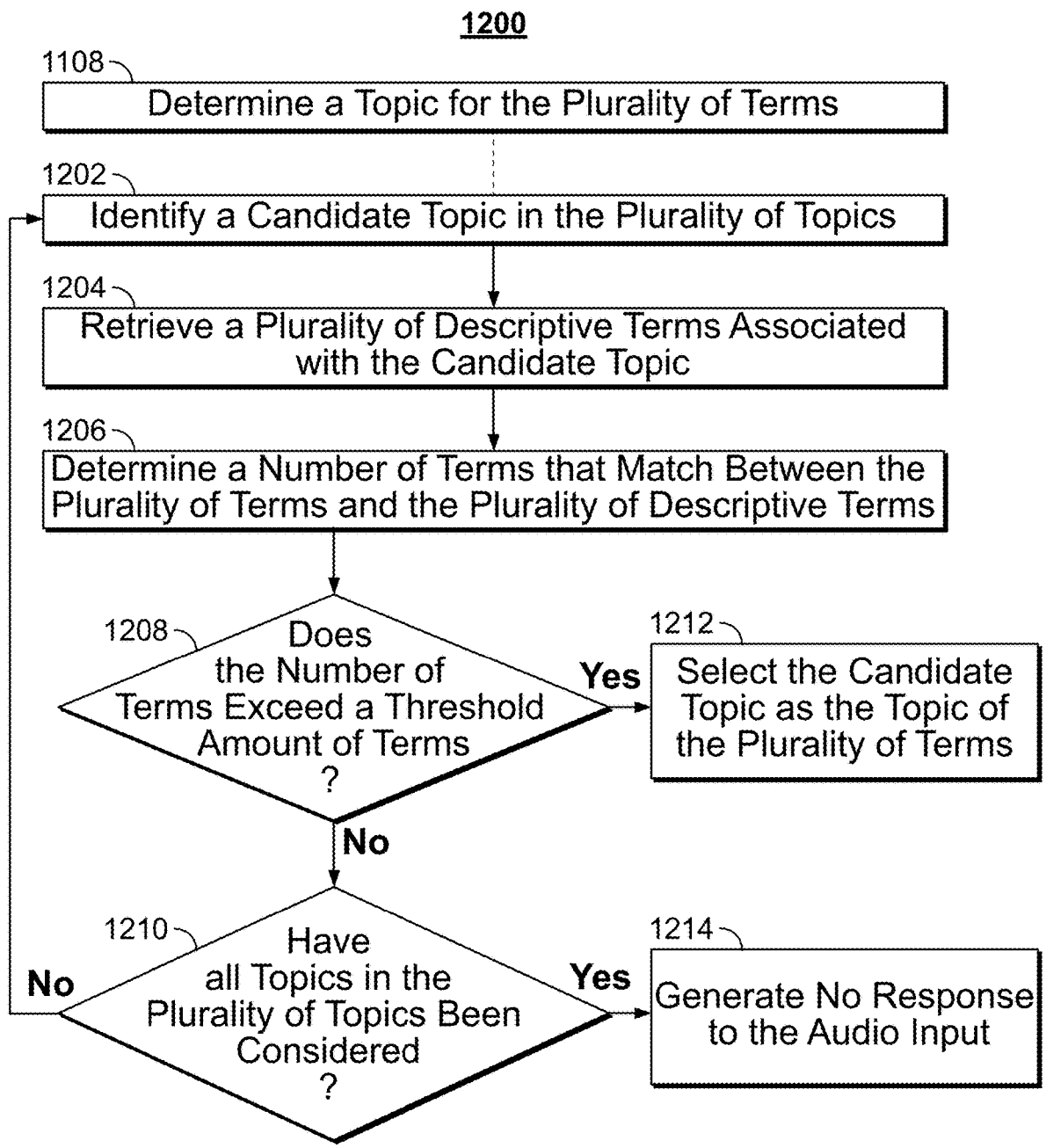
FIG. 12 is a flowchart of an illustrative process for determining a topic for an audio input based on a number of matching descriptive terms, in accordance with some embodiments of the disclosure.

FIG. 12 is a flowchart of illustrative process 1200 for determining a topic for an audio input based on a number of matching descriptive terms, in accordance with some embodiments of the disclosure. Process 1200 elaborates on 1108 of process 1100 (i.e., determining a topic for the plurality of terms). At 1202, control circuitry 904 identifies a candidate topic in the plurality of topics. Referring to example 700, the first candidate topic is "Harry Potter." At 1204, control circuitry 904 retrieves a plurality of descriptive terms associated with the candidate topic (e.g., from storage 908 of device 1002 and/or server 1006 via communication network 1004). Example 400 depicts array 404, which is retrieved by control circuitry 904 and lists the descriptive terms of the topic "Harry Potter." At 1206, control circuitry 904 determines a number of terms that match between the plurality of terms and the plurality of descriptive terms. For example, the number of matches between the terms of audio input 402 and array 404 is four, namely "Daniel Radcliffe," "Wizard," "Child Actor," "Play."

At 1208, control circuitry 904 determines whether the number of terms exceeds a threshold amount of terms (e.g., stored in storage 908). As described in example 400, the threshold amount of terms may be 50%. The threshold amount of terms is an adjustable parameter that a user may change in order to change the sensitivity of topic matches. In response to determining that the number of terms meets or exceeds the threshold amount of terms, process 1200 ends at 1212, where control circuitry 904 selects the candidate topic as the topic of the plurality of terms (e.g., because 57% of the descriptive terms match and this value exceeds 50%, audio input 402 is classified under the topic "Harry Potter").

In response to determining that the number of terms does not exceed the threshold, at 1210 control circuitry 904 determines whether all topics in the plurality of topics have been considered. If control circuitry 904 determines that there are other unique topics in the plurality of topics which have yet to be considered, process 1200 returns to 1202. Otherwise, at 1214, control circuitry 904 determines not to generate a response to the audio input.

Figure 13:
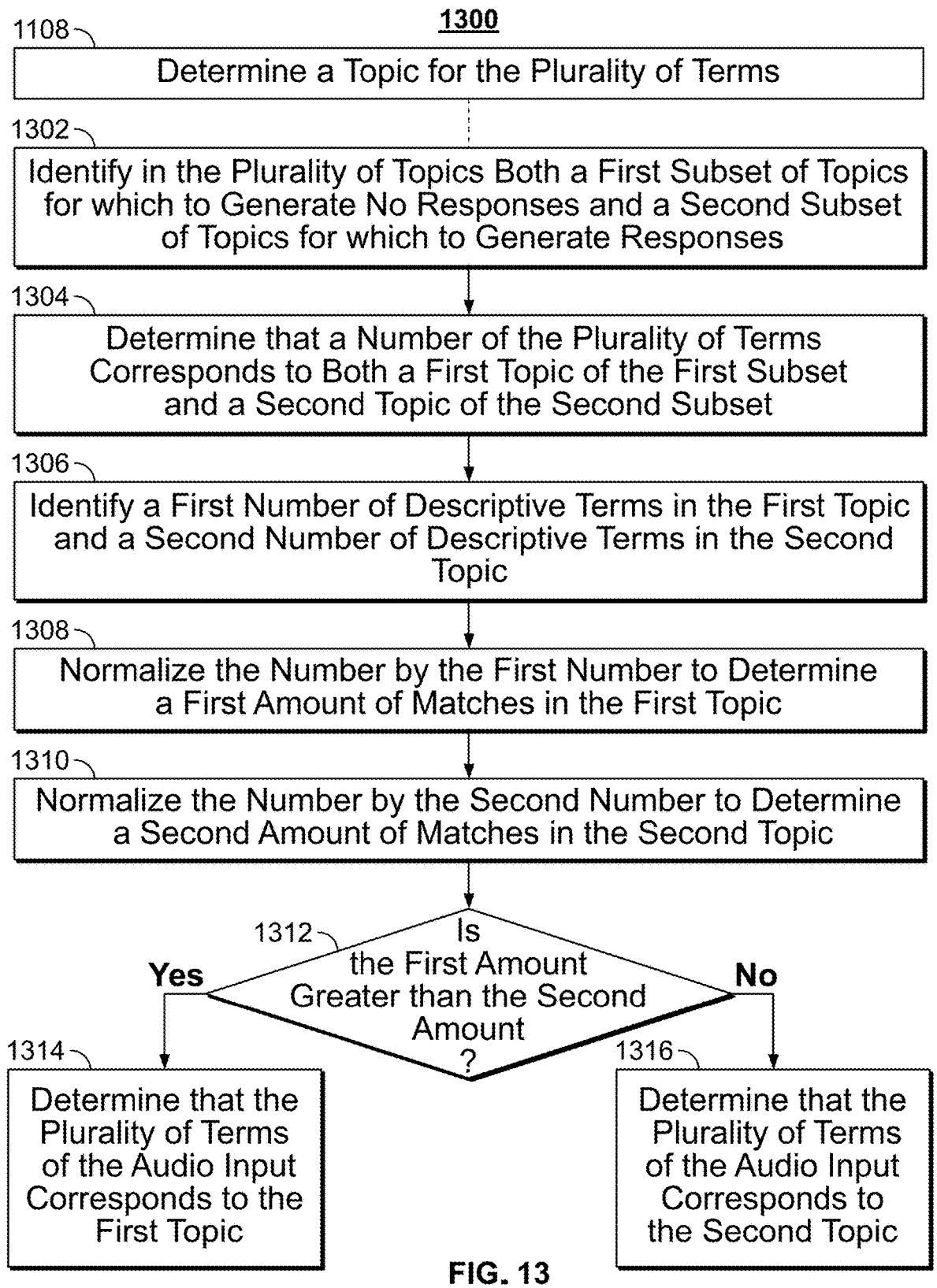
FIG. 13 is a flowchart of an illustrative process for determining a topic for an audio input based on a normalized number of matching descriptive terms, in accordance with some embodiments of the disclosure.

Although ending process 1200, in response to selecting the first candidate topic that meets or exceeds the threshold amount of terms, conserves processing resources, control circuitry 904 may attempt to identify the most relevant topic from the plurality of topics. FIG. 13 is a flowchart of illustrative process 1300 for determining a topic for an audio input based on a normalized number of matching descriptive terms over multiple topics, in accordance with some embodiments of the disclosure. Process 1300 elaborates on 1108 of process 1100 (i.e., determining a topic for the plurality of terms). At 1302, control circuitry 904 identifies in the plurality of topics both a first subset of topics for which to generate no responses and a second subset of topics for which to generate responses. Referring to example 700, control circuitry 904 may be configured to generate responses for the first subset comprising topics such as "Harry Potter," "NBA," and "Weather." Control circuitry 904 may additionally be configured to generate no responses for the second subset comprising topics such as "MLB" and "Game of Thrones." The first subset and the second subset may be found in a single data structure or separate data structures (e.g., stored in storage 908 of device 1002 and/or server 1006).

At 1304, control circuitry 904 determines that a number of the plurality of terms corresponds to both a first topic of the first subset and a second topic of the second subset. In an example where the first topic is "Harry Potter" and the second topic is "MLB," control circuitry 904 may determine that in each topic, five descriptive terms match with terms in the audio input. At 1306, control circuitry 904 identifies a first number of descriptive terms in the first topic and a second number of descriptive terms in the second topic. For example, the topic of "Harry Potter" may have a total of 10 descriptive terms and the topic of "MLB" may have 30 descriptive terms. At 1308, control circuitry 904 normalizes the number by the first number to determine a first amount of matches in the first topic. For example, control circuitry 904 may divide 5 by 10 to get 50%. At 1310, control circuitry 904 normalizes the number by the second number to determine a second amount of matches in the second topic. For example, control circuitry 904 may divide 5 by 30 to get 17%.

At 1312, control circuitry 904 determines whether the first amount is greater than the second amount. In response to determining that the first amount is greater than the second amount, at 1314 control circuitry 904 determines that the plurality of terms of the audio input corresponds to the first topic. In response to determining that the first amount is not greater than the second amount, at 1316 control circuitry 904 determines that the plurality of terms of the audio input corresponds to the second topic. If the audio input is classified under the first topic, a response is generated by control circuitry 904. If the audio input is classified under the second topic, no response is generated by control circuitry 904.

In this example, although both topics featured the same number of matches with the descriptive terms, normalizing the number of matches by the respective total number of descriptive terms helps identify the topic that is specifically focused on the terms found in the audio input. This is because a greater number of matches in a smaller pool of descriptive terms indicates that the terms of the audio input refer to a niche subject or a specific portion of a subject. In another example, if the first topic is "Quidditch" (e.g., a sport that is a part of the "Harry Potter" series) and the second topic is "Harry Potter," the user may not be interested in acquiring responses for "Harry Potter," but may be interested in the specific sport of "Quidditch." The topic of "Quidditch" may have significantly fewer descriptive terms than "Harry Potter," and several descriptive terms may overlap between the two topics. Given the scenario in which the audio input is a query about a Quidditch fun fact, control circuitry 904 may identify that the same number of matches exists between the terms of the audio input and the respective topics. By normalizing the number of matches by the total number of descriptive terms in each topic, control circuitry 904 will determine that the more relevant topic is "Quidditch." Appropriately, control circuitry 904 will generate a response to the audio input.

Figure 14:
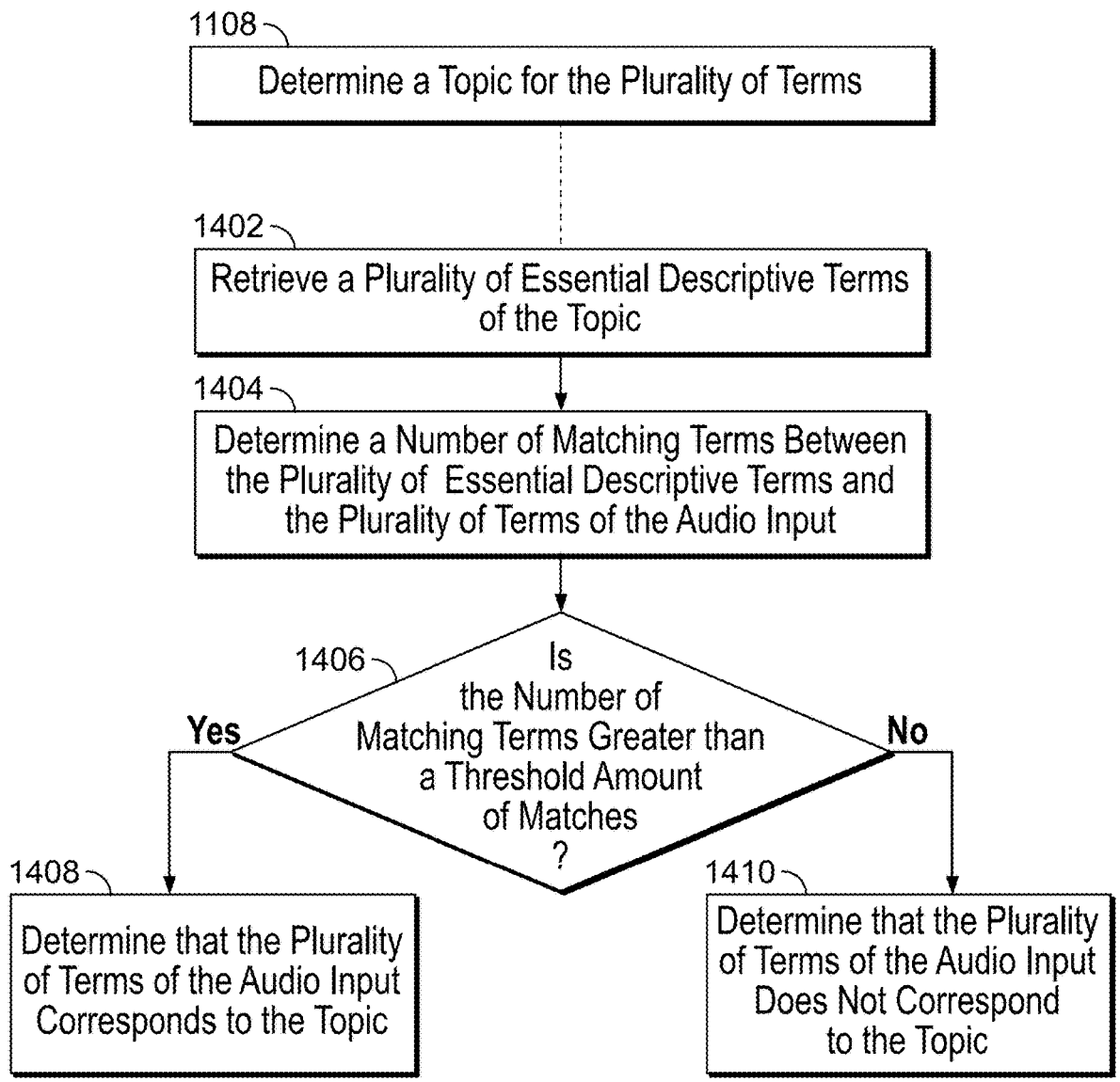
FIG. 14 is a flowchart of an illustrative process for determining a topic for an audio input based on a number of matching essential descriptive terms, in accordance with some embodiments of the disclosure.

FIG. 14 is a flowchart of illustrative process 1400 for determining a topic for an audio input based on a number of matching essential descriptive terms, in accordance with some embodiments of the disclosure. Process 1400 elaborates on process 1108 (i.e., determining a topic for the plurality of terms). At 1402, control circuitry 904 retrieves a plurality of essential descriptive terms of the topic (e.g., from storage 908 of device 1002 and/or server 1006 via communication network 1004). As described in example 600, the essential descriptive terms for the topic "MLB" are "professional baseball" and "Yankees." At 1404, control circuitry 904 determines a number of matching terms between the plurality of essential descriptive terms and the plurality of terms of the audio input. In example 600, audio input 602 features none of the essential descriptive terms for "MLB."

At 1406, control circuitry 904 determines whether the number of matching terms is greater than or equal to a threshold amount of matches (e.g., in storage 908). For example, the minimum number of matches needed may be "one." In response to determining that the number of matching terms is greater than the threshold amount of matches, at 1408, control circuitry 904 determines that the plurality of terms of the audio input corresponds to the topic. In response to determining that the number of matching terms is not greater than the threshold amount of matches (e.g., as in example 600) at 1410, control circuitry 904 determines that the plurality of terms of the audio input does not correspond to the topic.

Figure 15:
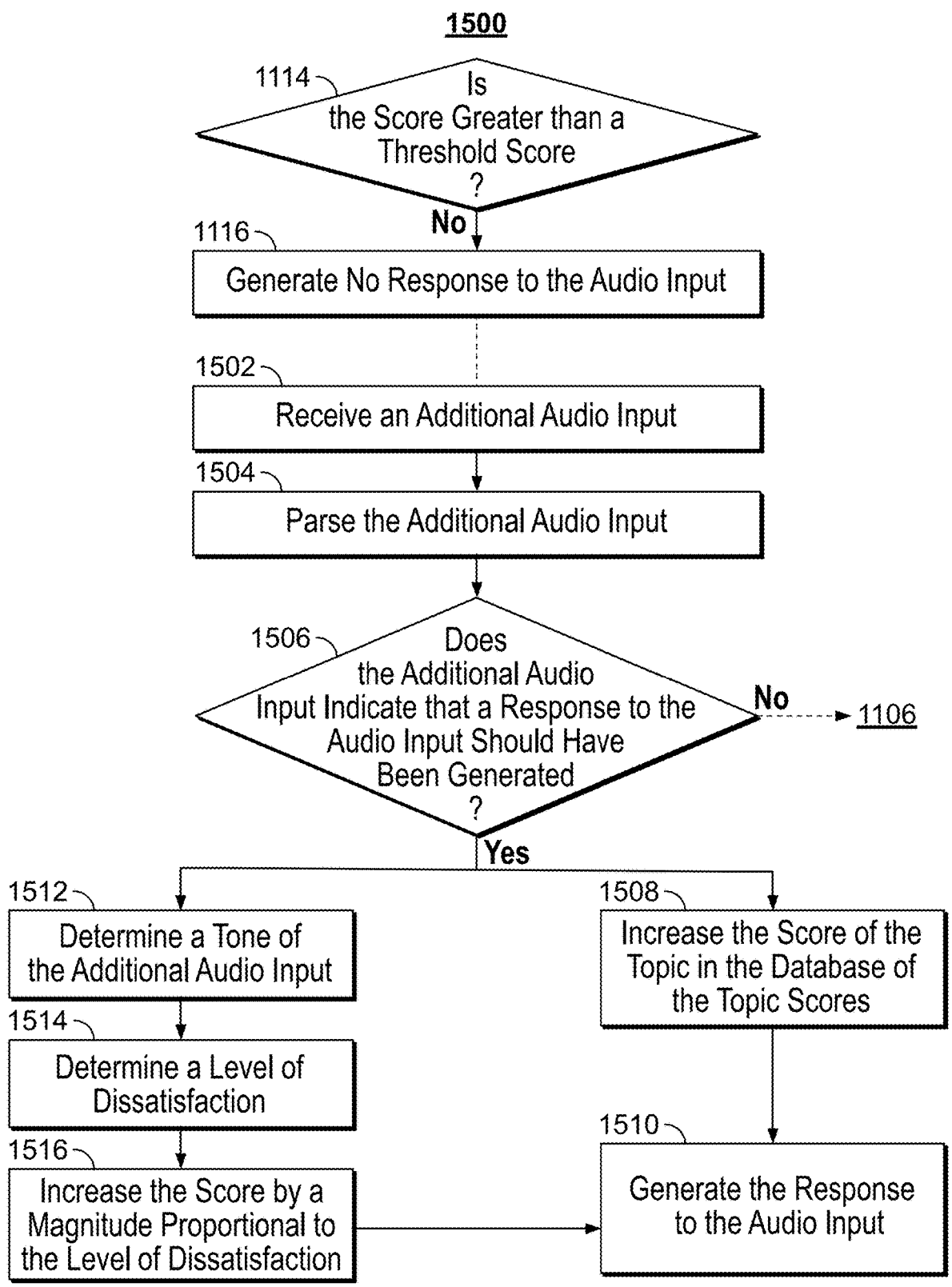
FIG. 15 is a flowchart of an illustrative process for increasing the score of a particular topic, in accordance with some embodiments of the disclosure.

FIG. 15 is a flowchart of illustrative process 1500 for increasing the score of a particular topic, in accordance with some embodiments of the disclosure. Process 1500 may be executed by control circuitry 904 subsequent to generating no response to the audio input at 1116 in response to determining that the score is not greater than the threshold score at 1114. At 1502, control circuitry 904 receives an additional audio input (e.g., via I/O Path 902). The additional audio input may for example be "I need an answer." At 1504, control circuitry 904 parses (e.g., using a speech-to-text algorithm) the additional audio input.

At 1506, control circuitry 904 determines whether the additional audio input indicates that a response to the audio input should have been generated. For example, using natural language processing, control circuitry 904 determines whether the additional audio input is a request for a response. Furthermore, control circuitry 904 determines whether the additional audio input is specifically referring to the initial audio input. This determination may also be performed using natural language processing or can be time-based. For example, control circuitry 904 may determine whether the additional audio input was received within a threshold period of time (e.g., stored in storage 908) from the receipt time of the audio input. If control circuitry 904 detects that the additional audio input was received within a threshold period of time (e.g., ten seconds) and that the additional audio input is requesting an answer, control circuitry 904 determines that a response to the audio input should have been generated. In response to determining that the additional audio input indicates that a response should have been generated, process 1500 may proceed to either 1508 or 1512. In response to determining that the additional audio input does not indicate that a response should have been generated to the audio input, process 1500 ends and process 1100 may begin from 1106 (e.g., treating the additional audio input as an independent query).

Returning to the example in which control circuitry 904 determines that a response to the audio input should have been generated, control circuitry 904 decides the path to take (i.e., between going to 1508 or 1512) based on user-selected settings. For example, control circuitry 904 may retrieve a user profile (e.g., from storage 908) that indicates whether control circuitry 904 should determine the tone of the additional audio input or simply increase the score of a topic by a predetermined amount. If the user profile indicates that control circuitry 904 should adjust scores based on the tone detected in an audio input, process 1500 advances to 1512, where control circuitry 904 determines a tone of the additional audio input.

For example, control circuitry 904 extracts frequency, temporal, and decibel information from the additional audio input. The tone of the additional audio input may be a function of these three parameters or any combination thereof. Control circuitry 904 may compare the three parameters with pre-classified data (e.g., retrieved from server 1006 via communication network 1004) that matches a tone (e.g., angry, sad, surprised, happy, etc.) with a frequency, temporal, and decibel signature respectively. In response to identifying a tone with a frequency, temporal, and decibel signature that matches with the frequency, temporal, and decibel information of the additional audio input, process 1500 proceeds to 1514, where control circuitry 904 determines a level of dissatisfaction based on the tone of the additional audio input. Each classifiable tone may have an associated quantified level of dissatisfaction. If there are five classifiable tones, namely "angry," "sad," "surprised," "happy," and "monotone," each may be assigned a number from one to five (where a higher number is indicative of greater dissatisfaction). In this particular example, "angry" corresponds to a level of dissatisfaction of 5, whereas "happy" corresponds to a level of dissatisfaction of 1.

At 1516, control circuitry 904 increases the score by a magnitude proportional to the level of dissatisfaction. Referring to example 700, the score of "MLB" is 40. If a response is not generated for an audio input classified as "MLB," the user may angrily demand an answer. In response to determining that the additional audio input has a level of dissatisfaction of 5, control circuitry 904 may increase the score of "MLB" by a multiple of 5 (e.g., 50), totaling the score to be 90. If the tone of the additional audio input was happy, control circuitry 904 may increase the score by 10, totaling the score to be 50. Alternatively, process 1500 may advance from 1506 to 1508 (e.g., if the user profile indicates that control circuitry 904 should not detect tones). At 1508, control circuitry 904 increases the score of the topic in the database of topic scores (e.g., by a predetermined amount indicated in the user profile). Considering example 700, control circuitry 904 may increase the score just enough for a topic (e.g., "MLB") to exceed the threshold score (e.g., 50). At 1510, control circuitry 904 generates the response to the audio input.

Figure 16:
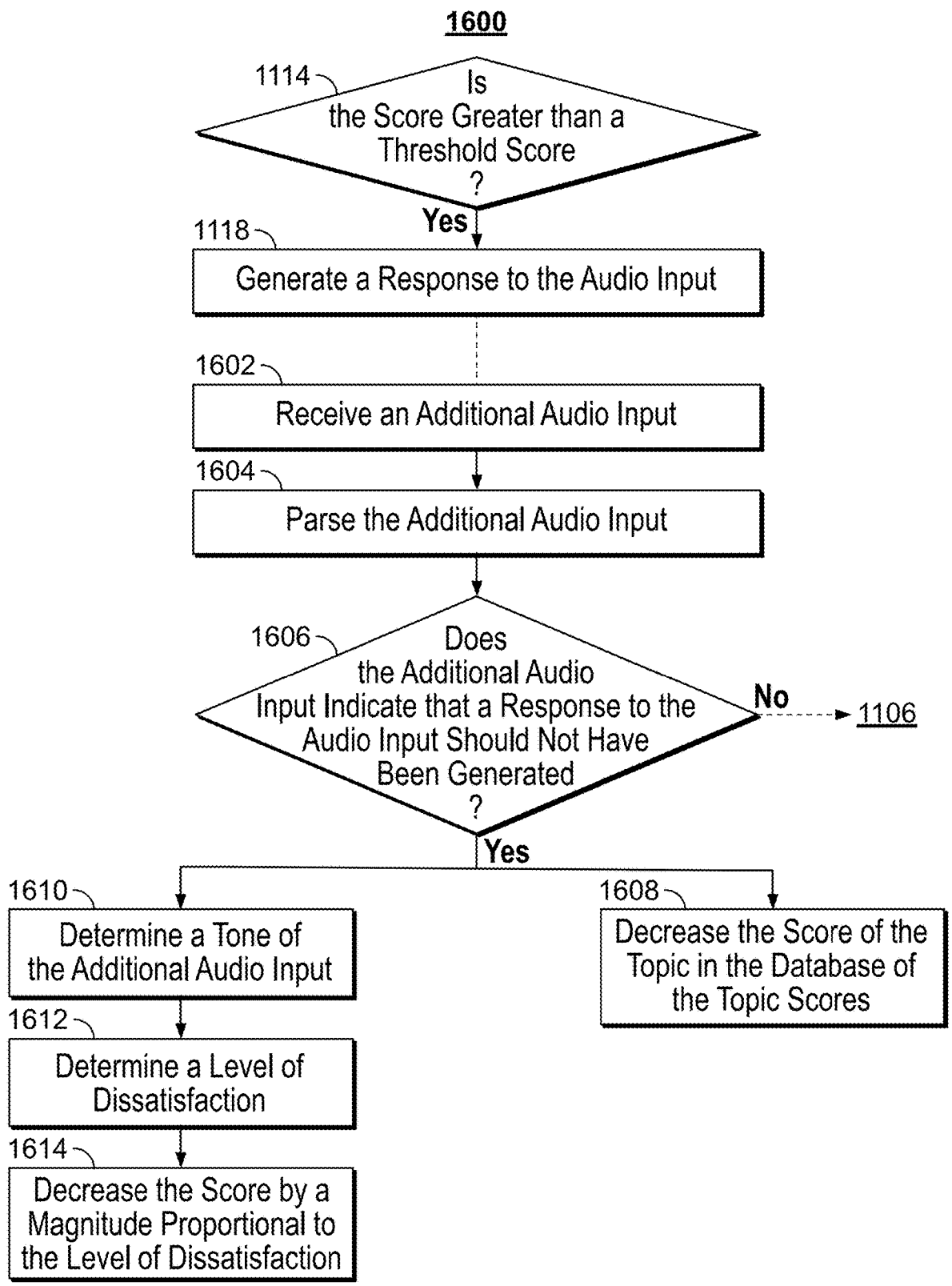
FIG. 16 is a flowchart of an illustrative process for decreasing the score of a particular topic, in accordance with some embodiments of the disclosure.

FIG. 16 is a flowchart of illustrative process 1600 for decreasing the score of a particular topic, in accordance with some embodiments of the disclosure. Process 1600 may be executed by control circuitry 904 subsequent to generating a response to the audio input at 1118 in response to determining that the score is greater than the threshold score at 1114. At 1602, control circuitry 904 receives an additional audio input (e.g., "I didn't need a response"). At 1604, control circuitry 904 parses the additional audio input. At 1606, control circuitry 904 determines whether the additional audio input indicates that a response to the audio input should not have been generated. In response to determining that the additional audio input does not indicate that a response should not have been generated, process 1600 ends and process 1100 may begin from 1106 (e.g., treating the additional audio input as an independent query). In response to determining that the additional audio input indicates that a response should not have been generated, process 1600 may proceed to either 1608 or 1610. Control circuitry 904 may decide the path to take based on user-selected settings. For example, control circuitry 904 may retrieve a user profile that indicates whether control circuitry 904 should determine the tone of the additional audio input or simply increase the score of a topic by a predetermined amount. If the user profile indicates that control circuitry 904 should adjust scores based on the tone detected in an audio input, process 1600 advances to 1610, where control circuitry 904 determines a tone (e.g., angry) of the additional audio input. At 1612, control circuitry 904 determines a level of dissatisfaction based on the tone of the additional audio input (e.g., a level of dissatisfaction of 5 as discussed in FIG. 15). At 1614, control circuitry 904 decreases the score by a magnitude proportional to the level of dissatisfaction (e.g., by 50). Alternatively, process 1600 may advance from 1606 to 1608 (e.g., if the user profile indicates that control circuitry 904 should not detect tones). At 1608, control circuitry 904 decreases the score of the topic in the database of topic scores (e.g., by a predetermined amount indicated in the user profile).

It should be noted that processes 1100-1600 or any step thereof could be performed on, or provided by, any of the devices shown in FIGS. 9-10. For example, the processes may be executed by control circuitry 904 (FIG. 9) as instructed by an NLUI application implemented on device 1002 and/or server 1006. In addition, one or more steps of a process may be incorporated into or combined with one or more steps of any other process or embodiment (e.g., steps from process 1200 may be combined with steps from process 1300). In addition, the steps and descriptions described in relation to FIGS. 11-16 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method for interacting with a virtual assistant, the method comprising:
  receiving a first audio input;
  determining a topic associated with the first audio input;
  determining that a score associated with the topic is below a predetermined value;
  in response to determining that the score associated with the topic is below the predetermined value, generating no response to the first audio input;
  receiving a second audio input;
  determining whether the second audio input indicates a request for a response for the first audio input; and
  in response to determining that the second audio input indicates a request for a response for the first audio input:
    increasing a score associated with the topic; and
    generating a response to the first audio input.

2. The method of claim 1, wherein the first audio input is received prior to the second audio input.

3. The method of claim 1, further comprising:
  receiving a third audio input;
  determining that the third audio input is associated with the topic;
  determining that the score is above the predetermined value; and
  generating a response to the third audio input.

4. The method of claim 1, wherein the first audio input does not comprise a wake word.

5. The method of claim 1, wherein increasing the score associated with the topic comprises:
  determining a tone associated with the second audio input;
  determining a level of dissatisfaction based on the tone; and
  increasing the score by a magnitude proportional to the level of dissatisfaction.

6. The method of claim 1, wherein increasing the score associated with the topic comprises increasing a value of the score to greater than the predetermined value.

7. The method of claim 1, wherein determining whether the second audio input indicates the request for the response for the first audio input, comprises determining whether the second audio input refers to the first audio input.

8. The method of claim 7, wherein determining whether the second audio input refers to the first audio input comprises determining that less than a threshold amount of time has passed between receiving the first audio input and receiving the second audio input.

9. The method of claim 1, further comprising:
  prior to determining the topic associated with the first audio input:
    retrieving a wake term from a memory;
    comparing the wake term with a plurality of terms in the first audio input; and
    in response to determining, based on the comparing, that the wake term is not present in the plurality of terms, determining the topic for the first audio input.

10. The method of claim 1, wherein the score associated with the topic is a time-based score associated with the topic, and wherein increasing the time-based score associated with the topic, comprises:
  identifying a time corresponding to the first input; and
  increasing the time-based score associated with the topic that corresponds to the time.

11. A system for interacting with a virtual assistant, the system comprising control circuitry configured to:
  receive a first audio input;
  determine a topic associated with the first audio input;
  determine that a score associated with the topic is below a predetermined value;
  in response to determining that the score associated with the topic is below the predetermined value, generate no response to the first audio input;
  receive a second audio input;
  determine whether the second audio input indicates a request for a response for the first audio input; and
  in response to determining that the second audio input indicates a request for a response for the first audio input:
    increase a score associated with the topic; and
    generate a response to the first audio input.

12. The system of claim 11, wherein the first audio input is received, by the control circuitry, prior to the second audio input.

13. The system of claim 11, wherein the control circuitry is further configured to:
  receive a third audio input;
  determine that the third audio input is associated with the topic;
  determine that the score is above the predetermined value; and
  generate a response to the third audio input.

14. The system of claim 11, wherein the first audio input does not comprise a wake word.

15. The system of claim 11, wherein the control circuitry is further configured, when increasing the score associated with the topic, to:
  determine a tone associated with the second audio input;
  determine a level of dissatisfaction based on the tone; and
  increase the score by a magnitude proportional to the level of dissatisfaction.

16. The system of claim 11, wherein the control circuitry is further configured, when increasing the score associated with the topic, to increase a value of the score to greater than the predetermined value.

17. The system of claim 11, wherein the control circuitry is further configured, when determining whether the second audio input indicates the request for the response for the first audio input, to determine whether the second audio input refers to the first audio input.

18. The system of claim 17, wherein the control circuitry is further configured, when determining whether the second audio input refers to the first audio input, to determine that less than a threshold amount of time has passed between receiving the first audio input and receiving the second audio input.

19. The system of claim 11, wherein the control circuitry is further configured, prior to determining the topic associated with the first audio input, to:
  retrieve a wake term;
  compare the wake term with a plurality of terms in the first audio input; and
  in response to determining, based on the comparing, that the wake term is not present in the plurality of terms, determining the topic for the first audio input.

20. The system of claim 11, wherein the score associated with the topic is a time-based score associated with the topic, and wherein increasing the time-based score associated with the topic, comprises:

identifying a time corresponding to the first input; and
increasing the time-based score associated with the topic that corresponds to the time.

* * * * *